United States Patent Office 2,883,510
Patented Apr. 21, 1959

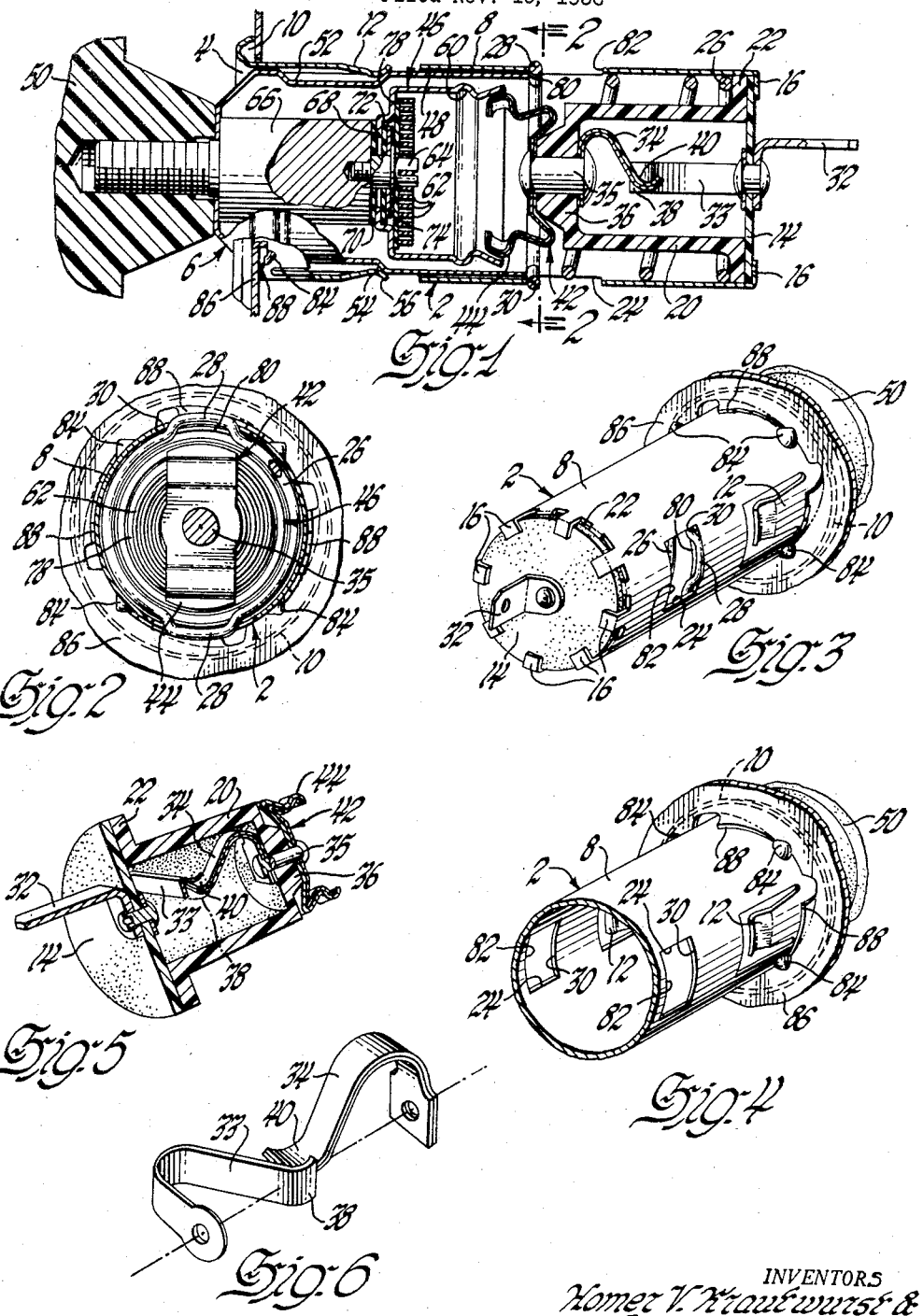

2,883,510

CIGAR LIGHTER ASSEMBLY

Homer V. Krautwurst and Donald G. Dening, Rochester, N.Y., assignors to General Motors Corporation, Detroit, Mich., a corporation of Delaware Application November 19, 1956, Serial No. 623,142

16 Claims. (Cl. 219—32)

The present invention relates to a cigar lighter assembly and, in particular, to an improvement in the type of assembly shown in the co-pending application of Clarence H. Jorgensen and Donald G. Dening, Serial No. 375,318, filed August 30, 1953.

Cigar lighter assemblies of the type disclosed in the aforementioned co-pending application typically comprise a holding or mounting case secured to the instrument panel of a vehicle or other suitable support. In the usual installation, the mounting case is held on the instrument panel by means of an outer sleeve having one end threadably engaged with the exterior surface of the mounting case and the other end abutting the inner surface of the instrument panel to retain a flanged open end of the mounting case in position with respect to the outer surface of the instrument panel. The mounting case of such a structure has positioned therein a bi-metallic thermostatically responsive fixed latch and contact member for cooperation with a movable latch and contact member carried by a removable igniting unit or plug for the establishment of an igniting circuit upon inserting the igniting unit in the holding case far enough to establish contact between the fixed and movable contact members. The fixed and movable contact and latch members detachably hold the igniting unit within the mounting case in a circuit closing position until such time as the fixed bi-metallic member deflects from the movable contact member thereby unlatching the movable igniting unit and breaking the igniting circuit. Upon disengagement of the latch members, an ejector cup thrusts the igniting unit outwardly toward the open end of the case by means of an ejector spring having one end mounted in the base of the case and the other end abutting the base of the ejector cup.

In such a structure, it is necessary to utilize a series of washers to prevent short circuiting of the igniting circuit as current flows from a suitable power source, such as a vehicle battery, through the mounting case, latched contact members, igniting unit and the mounting case to ground. Furthermore, a washer acts as a stop to limit ejecting movement of the spring-biased cup. Therefore, it is desirable to utilize an assembly in which the ejector cup and many of the aforementioned components may be eliminated thereby simplifying the construction, reducing its cost and increasing ease of assembly thereof.

Moreover, it has been found desirable to provide a lighter assembly of this type with a circuit breaker assembly so designed as to break the igniting circuit upon overload thereof to prevent damage to the assembly. However, the inclusion of such a circuit breaker in the lighter assembly has resulted in many additional parts which has further complicated the assembly of the structure and increased its cost.

The cigar lighter assembly herein disclosed avoids these problems by providing a structure having a greatly reduced number of component parts and one which is easily removably mounted to an instrument panel or other suitable support.

Within the scope of this invention, there is provided a cigar lighter assembly comprising the usual mounting or holding case secured to an instrument panel and having an open end into which there is removably inserted an igniting unit, and in which mounting case there is positioned an ejector spring having a forwardly presented end coil which is directly engageable by the igniting unit to eject the latter upon the heating element of the igniting unit reaching the desired predetermined temperature.

Furthermore, the end coil of the ejector spring of this invention is provided with preferably two diametrically opposed radially projecting humps which extend through apertures in the wall of the holding case and normally abut the forward edges of these apertures to limit ejecting movement of the spring.

It is further contemplated to provide a circuit breaker structure of simplified construction which is so associated with the fixed latch and contact member and the ejector spring of the mounting case to eliminate many heretofore required elements such as washers.

The holding case is also provided with detent means which may cooperate with suitably formed ramps on the instrument panel or support so that the mounting case may be easily mounted and locked on the latter, thereby eliminating the need for an external sleeve threadably disposed on the mounting case to lock the latter to the instrument panel.

These and other advantages of the cigar lighter assembly of this invention will become more apparent as the description proceeds, reference being made therein to the drawings in which:

Figure 1 is a cross sectional elevation of the cigar lighter assembly comprising the mounting case and igniting unit;

Figure 2 is a cross section taken on line 2—2 of Figure 1;

Figure 3 is a perspective view of the means for mounting the holding case to a suitable support;

Figure 4 is another embodiment of the mounting means for the holding case;

Figure 5 is a perspective view of the circuit breaker assembly of Figure 1; and

Figure 6 is a view of the circuit breaker contact members.

Referring now to the drawings, and particularly Figures 1 to 3, there is shown a cigar lighter assembly comprising the holding or mounting case 2 through the open end 4 of which a cigar lighter igniting unit 6 is removably inserted. The holding case 2 includes a generally cylindrical body 8 having a flange 10 at its open end through which the igniting unit is removably inserted. Near its forward or open end, a plurality of circumferentially spaced resilient fingers 12 are stamped out of the body 8 so as to protrude slightly into the interior of the case body for a purpose which will appear more fully hereinafter. The case opposite its open end is closed by an annular insulating washer 14 retained in position by a plurality of circumferentially spaced locking tongs 16.

Seated within the holding case there is a circuit breaker housing of insulating material comprising a substantially cylindrically shaped main body portion 20 terminating at its rearmost end in a radially directed annular flange 22 which abuts the forward face of the insulating washer 14 and the interior wall of the cylindrically shaped mounting case body.

Intermediate the axial length of the holding case there are formed two diametrically opposed apertures 24. One end of an axially expansible and compressible coiled ejector spring 26 abuts the flange 22 of the circuit breaker housing, while the forward coil of this spring has two diametrically opposed radially projecting humps 28 which engage the forward edges 30 of the apertures 24 in the holding case. It will be seen from Figure 1 that all of the coils of this spring, except for the one closest to the open end of the case, lie very close to or slidably engage the inner surface of the cylindrical body 8 of the holding case, the radial humps 28 engaging the edges 30 of the holding case apertures to limit expansion of the spring while also maintaining its compression against the flange 22 of the circuit breaker housing to seat the latter against the insulated washer 14 closing one end of the holding case.

Suitably secured to the exterior face of the insulated washer 14 is a contact member 32 which may be electrically connected to a source of power such as a vehicle battery. Secured to the interior face of this insulating washer is a leaf spring 33 which is one of the cooperating elements of the circuit breaker. The second element of the circuit breaker is a bi-metallic thermostatically responsive member 34 which is riveted as at 35 or otherwise suitably secured to the head end 36 of the circuit breaker housing, and which element extends rearwardly within the main body of the circuit breaker housing to be engaged by the leaf spring 33. As will appear from the drawing, it is preferable that the two contact members of the circuit breaker be generally of the same leaf configuration and lie at right angles to each other with the end 38 of the leaf spring resiliently engaging the end 40 of the thermostatically responsive circuit breaker element 34. As will be apparent, upon circuit overload, the bi-metallic member 34 will deflect out of the path of the leaf spring 33 thereby permitting the latter to move beyond the plane of movement of the bi-metallic member whereby, upon return of the bi-metallic element to its normal circuit establishing position, the leaf spring will be out of contact with it. It is then necessary that the circuit breaker be manually reset.

A bi-metallic fixed latch and contact member 42 is connected to the head end 36 of the circuit breaker housing as by the rivet 35 so as to be presented to the open end 4 of the mounting case. Insofar as it is necessary for this disclosure, it will be seen that the contact member 42 includes radially outwardly directed projections 44 which are engageable by a movable latch and contact member 46 carried by the igniting unit as will appear more fully hereinafter.

The igniting unit or plug 6 comprises an outer cylindrical sleeve 48 to which a handling knob 50 may be suitably secured. The outer sleeve or body portion 48 of the igniting unit has an annular depression 52 resulting in a forwardly and outwardly sloping shoulder 54 which is engageable by the tips 56 of the resilient fingers 12 to maintain the igniting unit in a normal position of non-use within the holding case. Within the igniting unit sleeve there is a substantially cup-shaped member 46 which is radially spaced from the inner surface of the igniting unit sleeve and recessed from the forward edge of the latter. This cup-shaped member is the movable contact and latch member of the lighter assembly and comprises a radially outwardly extending annular depression 60 which is engageable by the projections 44 of the bi-metallic fixed contact member 42 to latch the igniting unit in a circuit closing position within the holding case. A heating element 62 is spirally coiled within the cup-shaped shield member 46 and has one end mechanically and electrically connected to the latter in the usual manner, while the other end is staked to the current conducting centrally disposed stud 64. The stud 64 is secured to a cylindrical body or mass 66 having high heat retaining characteristics, which mass is in turn secured to the igniting unit sleeve 48 and igniting unit handling knob 50. It is preferred to use aluminum as the heat retaining mass in this preferred embodiment of invention.

Although forming no part of this invention, it will be noted that the end of the cup-shaped shield which lies behind the heating element terminates in an annular flange 68 suitably seated between a pair of insulating washers 70 and 72 which, respectively, engage one end of the aluminum heat retaining mass 66 and another washer 74 seated against one face of a radially projecting flange formed on the current conducting stud 64. The flange of the current conducting stud forms a backing and support for an annular washer 78 against which the heating element abuts.

Current is conducted to the heating element 62 from the power source through the contact 32, circuit breaker elements 33, 34, and engageable latch members 42, 46 and from the heating element through the stud 64, aluminum mass 66 and sleeve 48 to ground. It will be noted that the internal elements of the igniting unit are spaced from the inner walls of the sleeve 48 thereby forming a gap of air which serves, together with the aluminum heat retaining mass, to eliminate any heating of the sleeve 48 to prevent burning the user of the lighter.

In what may be termed its normal non-heating position as shown in Figure 1, the outer sleeve 48 of the igniting unit is slidably disposed within the cylindrical body 8 of the mounting case, the resilient fingers 12 engaging the shoulder 54 of the igniting unit sleeve to maintain it in this position for use. In this position the forward edge 80 of the sleeve 48 of the igniting unit lies substantially in the same plane as the forward edges 30 of the holding case which define in part the apertures 24 therein. Furthermore, the forward edge of the igniting unit sleeve is in such a position as to almost or slightly engage the radial humps 28 of the ejection spring 26. The engageable contact and latch members 42 and 46 are adjacent each other for ready engagement to close the igniting circuit upon the igniting unit being shifted further axially into the holding case.

Upon the igniting unit being pushed axially into the holding case by the user to establish an igniting or heating circuit as aforedescribed, the ejection spring is compressed throughout a portion or all of the axial length of the apertures 24, the rearward edges 82 of which may limit such movement. The igniting unit is maintained in this position by the engageable latch means until automatically disengaged by deflection of the bi-metallic latch member 42. At this time, the igniting circuit is broken and the ejector spring will thrust the igniting unit to its normal position as shown in Figure 1, the forward edges 30 of the apertures 24 limiting the ejecting expansion of the coiled spring and guiding the spring. Furthermore, the preset compression of the ejector spring in abutting at its rearmost end the flange 22 of the circuit breaker housing maintains the latter in its proper position in abutment against the insulating washer 14.

Referring now more particularly to Figures 2, 3 and 4, it may be seen that at its forward end the holding case is provided with a plurality of circumferentially spaced detent buttons 84 herein shown as being four in number. The support 86 on which the holding case is mounted is provided with a ramp 88 which may be of stepped construction as shown in Figure 3 or of smooth configuration as shown in Figure 4. In either embodiment, the radial height of the ramp varies and, in relationship to the tip of the detent buttons, is such as to enable easy insertion of the holding case through an aperture in the support so that, upon rotating the holding case relative to the support, the detent buttons will progressively seize the ramp on the support. The stepped construction of Figure 3 will more readily signify the relative position of the detent buttons and their respective ramps, thereby assuring that the holding case is properly secured and further preventing the holding case from becoming unlocked from its support due to vibrations and road shocks. It will be apparent that the locking ramps may be formed on the edge of the support defining the aperture into which the holding case is mounted or may be formed on a backing member behind the support. This arrangement permits easy removal of the case for maintenance purposes as well as facilitating external assembly with a minimum of parts.

From the above description, it will be seen that this invention results in a substantial elimination of components heretofore required in a cigar lighter assembly of this type. In particular, the ejector spring assembly herein disclosed eliminates the need for an ejector cup by reason of the spring directly engaging the body sleeve of the igniting unit. Because axial movement of the spring is limited by its engagement with means carried by the holding case, this construction further elminates the need for washers and other elements which have been heretofore utilized to limit the expansive ejecting movement of an ejector cup. Furthermore, the ejector spring performs another function in firmly seating the circuit breaker housing in the closed end of the cigar lighter holding case. These features, coupled with the detent mechanism for supporting the assembly on an instrument panel, result in the elimination of many components which tend to complicate the assembly and increase maintenance problems and costs.

We claim:

1. A cigar lighter assembly comprising a holding case, an igniting unit removably insertable therein, engageable latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to eject said igniting unit for use, said ejecting means comprising a compressible and expansible spring seated within said case, a radially extending hump formed on said spring for engagement by said igniting unit in establishing said circuit, a longtudinally extending aperture formed in the wall of said case, said hump extending through said aperture and being limited in ejecting movement by the forward edge of said aperture.

2. A cigar lighter assembly comprising a holding case, an igniting unit removably insertable therein, engageable latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to eject said igniting unit for use, said ejecting means comprising an axially coiled compressible and expansible spring seated within said case, a coil of said spring having diametrically opposed radially extending projections engageable by said igniting unit in establishing said circuit, opposed apertures formed in the wall of said case through which said projections extend, the edges of said apertures limiting axial movement of said spring by abutment with said projections.

3. A cigar lighter assembly comprising a holding case, an igniting unit removably insertable therein, engageable latch means carried respectively by said igniting unit and holding case for establishing an igniting circuit, said means being automatically disengageable to break the igniting circuit and release the igniting unit upon the latter reaching a predetermined temperature, ejecting means operative upon disengagement of said latch means to eject said igniting unit for use, said ejecting means comprising an axially coiled compressible and expansible spring seated within said case, a plurality of radially extending projections formed in a coil of said spring, a plurality of axially extending guide slots formed in the wall of said case through which said projections extend, the edges of said case defining said slots limiting movement of said spring in at least one direction by abutment with said projections.

4. A cigar lighter assembly comprising a holding case having an open end, an igniting unit removably mounted within said case through said open end, engageable latch means carried by said igniting unit and case to establish an igniting circuit, said means being automatically disengaged upon said igniting unit reaching a predetermined temperature, ejecting means engageable by said igniting unit as said igniting circuit is closed and operative upon disengagement of said latch means to eject said igniting unit toward the open end of said case, said ejecting means comprising an axially coiled spring mounted within said case for axial compression and expansion, an opening in the wall of said case intermediate its ends, a radial projection in the forward axially movable end coil of said spring projecting through said case opening and normally abutting the forward edge of said case surrounding said opening, said projection being axially rearwardly movable from said edge upon engagement by said igniting unit.

5. A cigar lighter assembly comprising a mounting case having an open end, an igniting unit removably mountable within said case through said open end, engageable latch means carried respectively by said igniting unit and case to establish an igniting circuit upon engagement thereof, said latch means being automatically disengaged upon said igniting unit reaching a predetermined temperature whereby said igniting unit is released for removal through the open end of said case, ejection means mounted within said case to thrust said igniting unit toward the open end of said case for use upon disengagement of said latch means, said ejection means comprising an axially compressible and expansible spring axially coiled within said case opposite the open end thereof, a coil of said spring being engageable by said igniting unit as the latter moves into the circuit closing position, radially projecting stop means on said spring coil, and an aperture in said case through which said stop means extends to limit the expansion of said spring in ejecting said igniting unit upon release of said latch means.

6. A cigar lighter assembly comprising a mounting case having an open end, an igniting unit removably mountable within said case through said open end, engageable latch means carried respectively by said igniting unit and case to establish an igniting circuit upon engagement thereof, said latch means being automatically disengaged upon said igniting unit reaching a predetermined temperature whereby said igniting unit is released for removal through the open end of said case, ejection means mounted within said case to thrust said igniting unit toward said open end for use upon disengagement of said latch means, said ejection means comprising an axially compressible and expansible spring axially coiled within said case opposite the open end thereof, a coil of said spring including a radial projection engageable by said igniting unit as the latter moves into the circuit closing position, and an aperture in said case through which said projection extends to limit ejecting expansion of said spring upon disengagement of said latch means.

7. A cigar lighter assembly comprising a mounting case having an open end, an igniting unit removably mountable within said case through said open end, engageable latch means carried respectively by said igniting unit and case to establish an igniting circuit upon engagement thereof, said latch means being automatically disengaged upon said igniting unit reaching a predetermined temperature whereby said igniting unit is released for removal through the open end of said case, ejection means mounted within said case to thrust said igniting unit toward said open end for use upon disengagement of said latch means, said ejection means comprising an axially compressible and expansible spring mounted within said case opposite the open end thereof, a radial hump on a coil of said spring engageable by said igniting unit as the latter moves into circuit closing position, an aperture in the wall of said case through which said hump projects, the eges of said case defining said aperture limiting axial movement of said spring by abutment with said hump.

8. A cigar lighter assembly comprising a mounting case having an open end, an igniting unit removably mountable within said case through said open end, engageable latch means carried respectively by said igniting unit and case to establish an igniting circuit upon engagement thereof, said latch means being automatically disengaged upon said igniting unit reaching a predetermined temperature whereby said igniting unit is released for removal through the open end of said case, ejection means mounted within said case to thrust said igniting unit toward said open end for use upon disengagement of said latch means, said ejection means comprising an axially compressible and expansible spring mounted within said case opposite the open end thereof, a radial hump on a coil of said spring engageable by said igniting unit as the latter moves into circuit closing position, an aperture in the wall of said case through which said hump projects, the edges of said case defining said aperture limiting expansion of said spring by abutment with said hump.

9. A cigar lighter assembly comprising a cylindrical mounting case having an open end, a circuit breaker housing co-axially mounted within said case opposite said open end, said housing comprising a cylindrical hollow body portion radially spaced from said mounting case, a radial flange on said housing slidably disposed within said case, an axially compressible and expansible coiled spring surrounding said body and abutting said flange, diametrically opposed radially projecting humps on a coil of said spring, apertures in the wall of said case through which said humps extend, the edges of said case surrounding said apertures forming stops to limit axial movement of said spring, a circuit breaker mounted within said housing, an igniting unit removably insertable within said case and comprising a cylindrical sleeve coaxially slidably disposed within said case through the open end thereof, engageable latch means carried respectively by said igniting unit and case to establish an igniting circuit upon engagement thereof, said latch means being automatically disengaged upon said igniting unit reaching a predetermined temperature, the humps of said spring being engageable by said igniting unit sleeve to compress the former in establishing the igniting circuit, said spring freely expanding upon release of said latching means until abutment of said humps with the edges of the mounting case defining the apertures therein.

10. A cigar lighter assembly comprising, a cylindrical mounting case having an open end, a circuit breaker housing coaxially mounted within said case opposite said open end; said housing comprising a cylindrical hollow body portion radially spaced from said mounting case, a radial flange on said housing and disposed within said case, a circuit breaker mounted within said housing; an axially compressible and expansible coiled spring surrounding said body and abutting said flange, diametrically opposed radially projecting humps on a coil of said spring, apertures in the wall of said case through which said humps extend, the edges of said case surrounding said apertures forming stops to limit movement of said spring; an igniting unit comprising a cylindrical sleeve coaxially slidably disposed within said case through the open end thereof, engageable latch means carried respectively by said igniting unit and circuit breaker housing to establish an igniting circuit upon engagement thereof, said latch means being automatically disengaged upon said igniting unit reaching a predetermined temperature, the humps of said spring being engageable by said igniting unit sleeve to compress said spring in establishing the igniting circuit, said spring freely expanding upon release of said latching means until abutment of said humps with the edges of the mounting case defining the apertures therein, a plurality of detent buttons circumferentially spaced about the exterior of said case, cooperating ramp means carried by a support and engageable by said detent buttons whereby said case and igniting unit are locked to said support.

11. A cigar lighter assembly of the type comprising a holding case and a removable igniting unit insertable therein, a support, an aperture in said support into which said case is mounted, a ramp on said support surrounding a portion of said aperture, a detent button fixed to the exterior of said case and engageable with said ramp whereby rotation of said case relative to said support engages the detent button and ramp to lock said case to said support.

12. The assembly as defined in claim 11 in which said ramp includes a plurality of circumferentially spaced step portions of varying radial heights relative to said detent button.

13. The cigar lighter assembly of claim 11 in which the radial height of said ramp relative to said detent button progressively infinitely varies throughout its circumferential extent.

14. A cigar lighter assembly comprising a holding case having an open end, an igniting unit removably insertable in said open end, engageable latch means carried respectively by said igniting unit and holding case for establishing an igniting circuit, said means being automatically disengageable to break the igniting circuit and release the igniting unit upon the latter, reaching a predetermined temperature, a circuit breaker housing mounted within said case opposite the open end of the latter, said housing comprising a hollow body portion radially spaced from said case, a radial flange on said housing spacing the latter from said case, an axially compressible and expansible spring surrounding said body and abutting said flange and engageable by said unit in establishing said circuit, and an abutment on said case engageable with said spring to limit expansible movement of the latter.

15. A cigar lighter assembly comprising a holding case, an igniting unit removably insertable therein, engageable latch means carried respectively by said igniting unit and holding case for establishing an igniting circuit, said means being disengageable to break the igniting circuit and release the igniting unit upon the latter reaching a predetermined temperature, ejecting means operative upon disengagement of said latch means to eject said igniting unit for use, said ejecting means comprising a compressible and expansible spring seated within said case and engageable by said igniting unit in establishing said circuit, a radially extending stop projection on said spring, and an aperture in said case through which said projection extends to limit expansible ejecting movement of said spring.

16. A cigar lighter assembly comprising a holding case having an open end, an igniting unit removably mounted within said case through said open end, engageable latch means carried by said igniting unit and case to establish an igniting circuit, said means being disengageable upon said igniting unit reaching a predetermined temperature, ejecting means engageable by said igniting unit as said igniting unit is closed and operative upon disengagement of said latch means to eject said igniting unit for use, said ejecting means comprising a spring having one end mounted within said case opposite the open end, the other end of said spring including a radial projection engageable by said igniting unit to compress said spring, and an aperture in said case through which said projection extends to limit expansion of said spring upon disengagement of said latch means.

References Cited in the file of this patent

UNITED STATES PATENTS

| Number | Name | Date |
|---|---|---|
| 2,113,535 | Cuno et al. | Apr. 5, 1938 |
| 2,117,703 | Cohen | May 17, 1938 |
| 2,126,710 | Ashton | Aug. 16, 1938 |
| 2,128,016 | Sinko | Aug. 23, 1938 |
| 2,140,311 | Cohen | Dec. 13, 1938 |
| 2,302,775 | Johnson | Nov. 24, 1942 |
| 2,386,168 | Pattberg | Oct. 2, 1945 |
| 2,704,318 | Jorgensen et al. | Mar. 15, 1955 |
| 2,778,915 | Jorgensen | Jan. 22, 1957 |